United States Patent
Katakami et al.

(10) Patent No.: US 12,354,818 B2
(45) Date of Patent: Jul. 8, 2025

(54) RELAY CONTROL DEVICE

(71) Applicants: DENSO ELECTRONICS CORPORATION, Anjo (JP); DENSO CORPORATION, Kariya (JP)

(72) Inventors: Taisuke Katakami, Anjo (JP); Yasuhiro Nagai, Anjo (JP); Tomoaki Tanaka, Anjo (JP); Shingo Kurita, Kariya (JP)

(73) Assignees: DENSO ELECTRONICS CORPORATION, Anjo (JP); DENSO CORPORATION, Kariya (JP)

( * ) Notice: Subject to any disclaimer, the term of this patent is extended or adjusted under 35 U.S.C. 154(b) by 154 days.

(21) Appl. No.: 18/457,933

(22) Filed: Aug. 29, 2023

(65) Prior Publication Data

US 2023/0411093 A1 Dec. 21, 2023

Related U.S. Application Data

(63) Continuation of application No. PCT/JP2022/017479, filed on Apr. 11, 2022.

(30) Foreign Application Priority Data

Apr. 23, 2021 (JP) .................. 2021-073527
Feb. 17, 2022 (JP) .................. 2022-023043

(51) Int. Cl.
*H03K 17/687* (2006.01)
*B60L 58/10* (2019.01)
*H01H 47/00* (2006.01)
*H02J 7/00* (2006.01)

(52) U.S. Cl.
CPC ............ *H01H 47/002* (2013.01); *B60L 58/10* (2019.02); *H02J 7/0029* (2013.01)

(58) Field of Classification Search
CPC ...... H01H 47/002; H01H 1/60; H01H 47/001; H02J 7/0029; H02J 7/0031; H02J 1/00; H02J 7/00
See application file for complete search history.

(56) References Cited

U.S. PATENT DOCUMENTS

2014/0354054 A1 * 12/2014 Katou .................. B60L 3/00
307/43
2019/0173292 A1 6/2019 Kim et al.

FOREIGN PATENT DOCUMENTS

JP 2013187941 A 9/2013
WO WO-2014041970 A1 3/2014

* cited by examiner

*Primary Examiner* — Muhammad S Islam
(74) *Attorney, Agent, or Firm* — Harness, Dickey & Pierce, P.L.C.

(57) ABSTRACT

A relay control device controls an operation of a relay circuit, which is disposed between a battery and an electric load, and the relay circuit is sealed in a case of a battery pack. The relay circuit includes: a first main relay disposed in a first conduction path which is connected to a first terminal of the battery; a second main relay disposed in a second conduction path which is connected to a second terminal of the battery; and a pre-charge relay connected to the second conduction path in parallel with the second main relay. The relay control device turns on the pre-charge relay, the first main relay, and the second main relay in order, and then turns off the pre-charge relay, the first main relay, and the second main relay in order.

4 Claims, 2 Drawing Sheets

COMPARATIVE EXAMPLE

RELAY CONTROL DEVICE

CROSS REFERENCE TO RELATED APPLICATIONS

The present application is a continuation application of International Patent Application No. PCT/JP2022/017479 filed on Apr. 11, 2022, which designated the U.S. and claims the benefit of priorities from Japanese Patent Application No. 2021-073527 filed on Apr. 23, 2021, and Japanese Patent Application No. 2022-023043 filed on Feb. 17, 2022. The entire disclosures of all of the above applications are incorporated herein by reference.

TECHNICAL FIELD

The present disclosure relates to a relay control device that controls an operation of a relay circuit including multiple relays.

BACKGROUND

There has been known a battery pack that includes a battery controller, a battery cell, a positive-side main relay, a negative-side main relay, and a pre-charge relay, and the battery controller controls turn-on and turn-off operations of the relays.

SUMMARY

The present disclosure provides a relay control device that controls an operation of a relay circuit. The relay circuit is disposed between a battery and an electric load, and the relay circuit is sealed in a case of a battery pack. The relay circuit includes: a first main relay disposed in a first conduction path which is connected to a first terminal of the battery; a second main relay disposed in a second conduction path which is connected to a second terminal of the battery; and a pre-charge relay connected to the second conduction path in parallel with the second main relay. The relay control device turns on the pre-charge relay, the first main relay, and the second main relay in order, and then turns off the pre-charge relay, the first main relay, and the second main relay in order.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
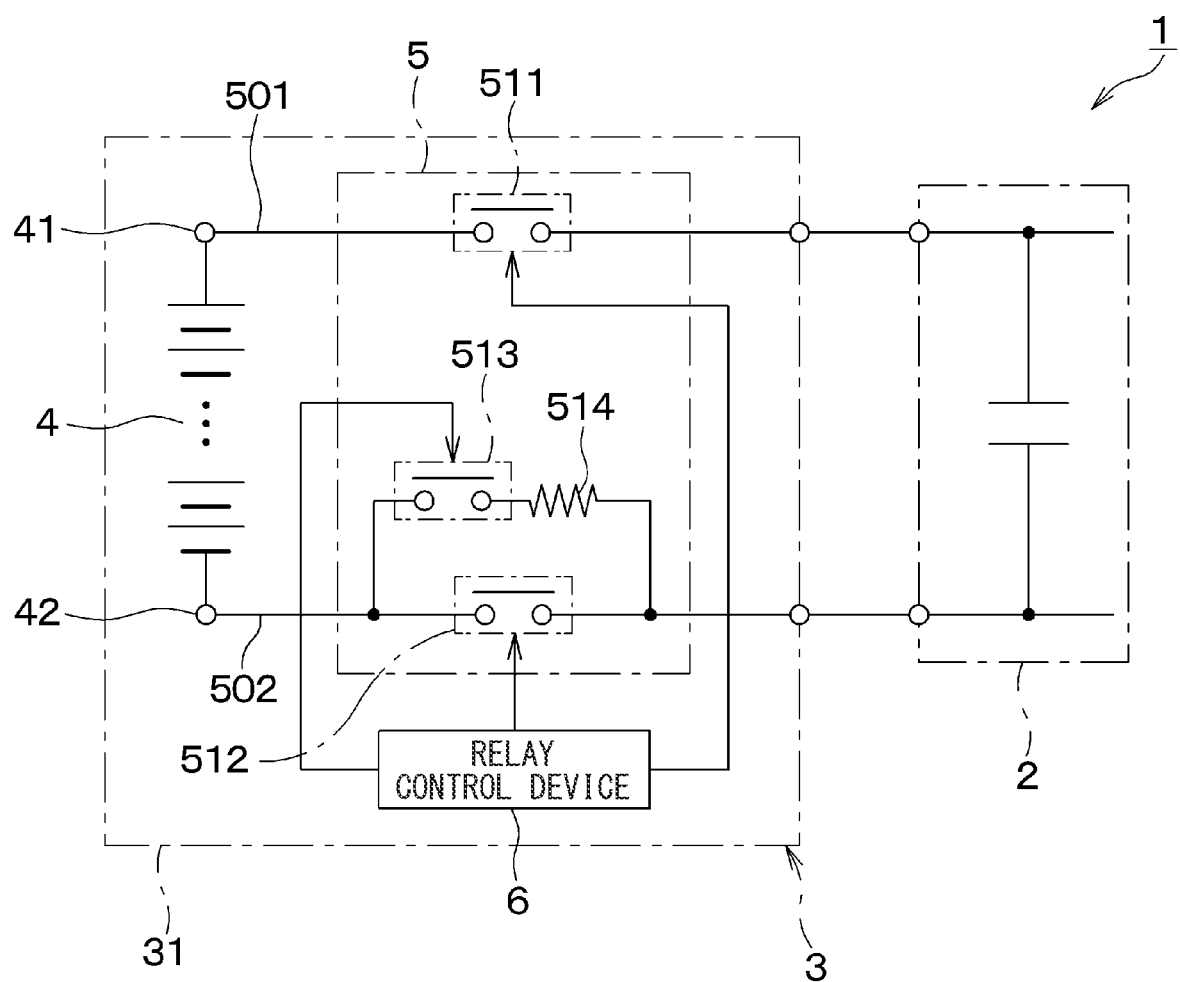
FIG. 1 is a circuit configuration diagram showing an internal configuration of battery pack including a relay control device according to an embodiment of the present disclosure.

Before describing embodiments of the present disclosure, a known art will be described. As well known, a vehicle includes an electric motor, a battery pack, and an inverter. The battery pack includes a battery controller, a battery cell, a positive-side main relay, a negative-side main relay, and a pre-charge relay. The positive-side main relay is interposed between a positive-side output terminal of an exterior case of the battery pack and a positive side of the battery cell to switch on and off the electric connection between an output circuit. The negative-side main relay is interposed between a negative-side output terminal of the exterior case of the battery pack and a negative side of the battery cell to switch on and off the electric connection between the output circuit. A pre-charge resistor and the pre-charge relay are connected in parallel with the positive-side main relay between the positive-side output terminal and the positive side of the battery cell as a bypass path.

At a startup time, the battery controller configures a bypass circuit by disconnecting the main relay on the positive side, conducting the main relay on the negative side, and conducting the pre-charge relay. By interposing the pre-charge resistor in the middle portion of the circuit, at the start of the power supply, the battery controller can suppress the supply current so that an excessive inrush current does not flow to the downstream side of the inverter or the like.

One reason of the relay contact failure is adhesion of insulator to the relay contact. The insulator is derived from siloxane. Specifically, a silicone-containing material may be used as an adhesive or a heat dissipation material in a sealed space of an electric device. In this case, the low molecular siloxane contained in the silicon material may be volatilized by the operation heat of the internal electronic components disposed inside the device, and siloxane gas may be generated. When the contact is opened and closed in a state of siloxane atmosphere that has entered the inside portion of the relay, the siloxane is oxidized and decomposed by thermal energy generated by the electric arc, and silicon dioxide may be generated. The generated silicon dioxide adheres to a surface of relay contact, and functions as insulator. Such entry of the siloxane gas into the inside portion of the relay and relay contact failure caused by the siloxane gas occurs remarkably in the open relay. In the sealed relay, the siloxane gas may enter the inside space of relay under the use environment, and a relay contact failure may be caused by the siloxane gas.

According to an aspect of the present disclosure, a relay control device that controls an operation of a relay circuit is provided. The relay circuit includes a first main relay, a second main relay, and a pre-charge relay. The relay control device includes a microcomputer that controls on and off states of the first main relay, the second main relay, and the pre-charge relay. The relay circuit is disposed between a battery and an electric load. The battery has a first terminal and a second terminal as a pair of terminals. The relay circuit is sealed in a case of a battery pack that includes the battery. The first main relay is disposed in a first conduction path which is connected to the first terminal of the battery. The second main relay is disposed in a second conduction path which is connected to the second terminal of the battery. The pre-charge relay is connected to the second conduction path in parallel with the second main relay. The microcomputer switches, at an arbitrary frequency, a first operation sequence and a second operation sequence. In the first operation sequence, the microcomputer turns on the pre-charge relay, the first main relay, and the second main relay in order, and then turns off the pre-charge relay, the first main relay, and the second main relay in order. In the second operation sequence, the microcomputer turns on the first main relay, the pre-charge relay, and the second main relay in order, and then turns off the pre-charge relay, the first main relay, and the second main relay in order. At least one of the first main relay, the second main relay, or the pre-charge relay is an open relay.

In the above configuration, at first, the pre-charge relay connected in parallel with the second main relay, which in off state, is turned on, and then the first main relay is turned on. When the first main relay is turned on, electric connection between the battery and the electric load is started.

Thereafter, the second main relay is turned on. Thereafter, the pre-charge relay connected in parallel with the second main relay, which is in on state, is turned off, and then the first main relay is turned off. When the first main relay is turned off, the electric connection between the battery and the electric load is ended. Thereafter, the second main relay is turned off.

As described above, in the above-described configuration, the start and end of the electric connection occur turn-on time and turn-off time of first main relay, respectively. Therefore, an insulator derived from siloxane may be generated when turning on and turning off the first main relay. On the other hand, when the second main relay and the pre-charge relay are turned on and turned off, electric arc caused by the start or end of the electric connection between the electric load and the battery is not generated. Thus, an insulator derived from siloxane is not generated when the second main relay and the pre-charge relay are turned on or turned off.

When the first main relay is turned off, the insulator derived from siloxane adheres to and deposits on the contact of the first main relay due to heat caused by the cut-off electric arc. The insulator adhered to and deposited on the contact of the first main relay is broken by the electric arc generated by application of high voltage when turning on the first main relay. As a result, the insulator is effectively removed from the contact, and conduction of the contact is ensured. According to the above-described configuration, it is possible to provide the relay control device capable of effectively suppressing occurrence of relay contact failure due to the adhesion of siloxane-derived insulator to the contact.

Embodiment

Hereinafter, embodiments of the present disclosure will be described with reference to the drawings. When various modifications applicable to one embodiment are inserted in the middle of the description relating to the embodiment, the understanding of the embodiment may be hindered. Therefore, the modifications will be described not in the middle of description relating to the embodiment, but collectively described after the description of one embodiment.
(Configuration)

As shown in FIG. 1, in the present embodiment, a vehicle system 1 is mounted on an electric vehicle, for example, a well-known hybrid vehicle. The vehicle system 1 includes an electric load 2 and a battery pack 3. The electric load 2 includes an inverter. The inverter is connected to a motor generator that generates a driving force for traveling purpose of the vehicle, and generates a charging power for charging a battery 4 included in the battery pack 3.

The battery pack 3 includes the battery 4, a relay circuit 5, and a relay control device 6. In the present embodiment, the battery 4, the relay circuit 5, and the relay control device 6 are housed in a case 31 of the battery pack 3 in sealed manner.

The battery 4 may be provided by a chargeable/dischargeable secondary battery (for example, a lithium-ion secondary battery). The battery 4 includes a first terminal 41 and a second terminal 42 as a pair of terminals. In the present embodiment, the first terminal 41 corresponds to a positive electrode terminal. The second terminal 42 corresponds to a negative electrode terminal.

The relay circuit 5 is disposed between the electric load 2 and the battery 4. The relay circuit 5 is interposed between a first conduction path 501, which is a conduction path connected to the first terminal 41 of the battery 4, and a second conduction path 502, which is a conduction path connected to the second terminal 42 of the battery 4.

The relay circuit 5 includes multiple relays, and switches on and switches off an electric connection between the electric load 2 and the battery 4 by turning on and turning off the relays. Specifically, the relay circuit 5 includes a first main relay 511, a second main relay 512, a pre-charge relay 513, and a pre-charge resistor 514.

The first main relay 511 is disposed in the first conduction path 501, and switches on or switches off the electric connection of the first conduction path 501. In the present embodiment, the first main relay 511 is an open-type electromagnetic relay. The relay control device 6 controls the first main relay 511 to open or close, that is, to turn on or turn off.

The second main relay 512 is disposed in the second conduction path 502. In the present embodiment, the second main relay 512 is an open-type electromagnetic relay. The relay control device 6 controls the second main relay 512 to open or close, that is, to turn on or turn off.

The pre-charge relay 513 is connected to the second conduction path 502 in parallel with the second main relay 512. The second main relay 512 and the pre-charge relay 513 are disposed to enable electric connection of the second conduction path 502 when either one is turned on. When both of the second main relay 512 and the pre-charge relay 513 are turned off, the electric connection of the second conduction path 502 is disabled. In the present embodiment, the pre-charge relay 513 is an open-type electromagnetic relay. The relay control device 6 controls the pre-charge relay 513 to open or close, that is, to turn on or turn off.

The pre-charge resistor 514 is connected with the pre-charge relay 513 in series manner. That is, the pre-charge resistor 514 is disposed, together with the pre-charge relay 513, in a bypass conduction path, which is disposed in parallel manner with the second main relay 512 of the second conduction path 502.

The relay control device 6 controls an operation of the relay circuit 5. The relay control device 6 controls an electric connection state between the electric load 2 and the battery 4 by controlling open/close states of the first main relay 511, the second main relay 512, and the pre-charge relay 513. Specifically, the relay control device 6 includes a microcomputer or an ASIC capable of controlling the open/close states of the first main relay 511, the second main relay 512, and the pre-charge relay 513 in a predetermined operation sequence. ASIC is an abbreviation for Application Special Integrated Circuit.

The relay control device 6 turns on the pre-charge relay 513, the first main relay 511, and the second main relay 512 in described order. Then, the relay control device 6 turns off the pre-charge relay 513, the first main relay 511, and the second main relay 512 in described order.

Effects

The following will describe an operation of the relay control device 6 together with the effects achieved by the configuration of relay control device according to the present embodiment with reference to the accompanying drawings.

Figure 2:
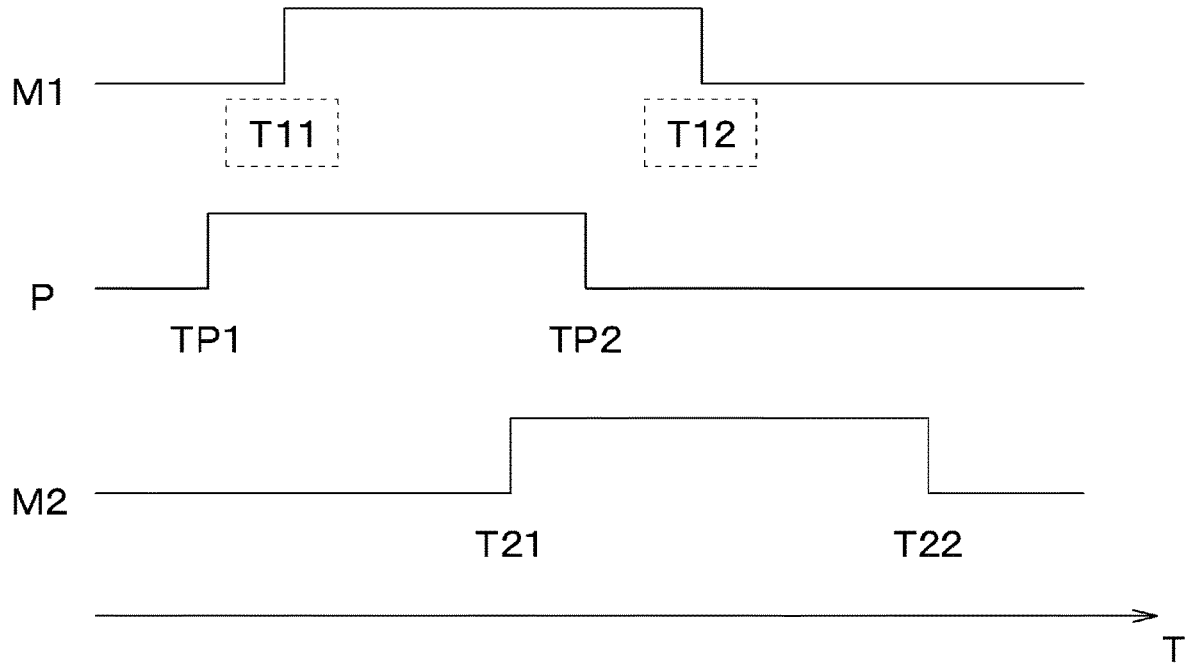
FIG. 2 is a time chart showing an operation control performed to a relay circuit by the relay control device shown in FIG. 1.

FIG. 2 is a time chart illustrating open and close time points of the first main relay 511, the second main relay 512, and the pre-charge relay 513 in the present embodiment. In FIG. 2, the horizontal axis T indicates time. In FIG. 2, "M1", "M2", and "P" indicate the first main relay 511, the second main relay 512, and the pre-charge relay 513, respectively. In the following description, the first main relay 511, the second main relay 512, and the pre-charge relay 513 may be collectively and simply referred to as relays.

Referring to FIG. 1 and FIG. 2, in an on sequence of the relays, the pre-charge relay 513, which is connected in parallel with the second main relay 512 in the off state, is turned on first at a time point TP1, and the first main relay 511 is turned on at a time point T11 subsequently. At the time point T11 when the first main relay 511 is turned on, the electric connection between the electric load 2 and the battery 4 is enabled. Thereafter, at a time point T21, the second main relay 512 is turned on. That is, the time point T11 at which the first main relay 511 is turned on, the time point T21 at which the second main relay 512 is turned on, and the time point TP1 at which the pre-charge relay 513 is turned on satisfy the time order of TP1, T11, and T21 from the earliest to the latest.

In an off sequence of the relays, the pre-charge relay 513, which is connected in parallel with the second main relay 512 in the on state, is turned off first at a time point TP2, and the first main relay 511 is turned off at a time point T12 subsequently. At the time point T12 when the first main relay 511 is turned off, the electric connection between the electric load 2 and the battery 4 is disabled. Thereafter, at a time point T22, the second main relay 512 is turned off. That is, the time point T12 at which the first main relay 511 is turned off, the time point T22 at which the second main relay 512 is turned off, and the time point TP2 at which the pre-charge relay 513 is turned off satisfy the time order of TP2, T12, and T22 from the earliest to the latest.

In FIG. 2, a start time and an end time of the electric connection between the electric load 2 and the battery 4 are surrounded by broken lines. As described above, in the above-described configuration, the start and end of the electric connection occur turn-on time and turn-off time of first main relay 511, respectively.

In the present embodiment, the first main relay 511, the second main relay 512, and the pre-charge relay 513 are disposed in a sealed space in the case 31 of the battery pack 3. The first main relay 511, the second main relay 512, and the pre-charge relay 513 are provided by open relays.

In the case 31 of the battery pack 3 providing the sealed space, a material including silicon may be used as adhesive material or heat dissipation material. In this case, the low molecular siloxane contained in the silicon material may be volatilized by the operation heat of the internal electronic components, and siloxane gas may be generated. That is, the sealed space of siloxane atmosphere may be formed in the case 31 that accommodates the relay circuit 5. When the contact is opened and closed in a state of siloxane atmosphere that has entered the inside portion of the relay, the siloxane is oxidized and decomposed by thermal energy generated by the electric arc, and silicon dioxide may be generated. The generated silicon dioxide adheres to a surface of relay contact, and functions as insulator. Such entry of the siloxane gas into the inside portion of the relay occurs remarkably in the open relay.

In the above-described configuration of the present embodiment, the start and end of the electric connection between the electric load 2 and the battery 4 occur turn-on time and turn-off time of the first main relay 511, respectively. Therefore, an insulator derived from siloxane may be generated when turning on and turning off the first main relay 511. On the other hand, when the second main relay 512 and the pre-charge relay 513 are turned on and turned off, electric arc caused by the start or end of the electric connection between the electric load 2 and the battery 4 is not generated. Thus, an insulator derived from siloxane is not generated when the second main relay 512 and the pre-charge relay 513 are turned on and turned off.

When the first main relay 511 is turned off, the insulator derived from siloxane adheres to and deposits on the contact of the first main relay 511 due to heat caused by the cut-off electric arc. The insulator adhered to and deposited on the contact of the first main relay is broken by an electric arc generated by application of high voltage when turning on the first main relay. As a result, the insulator is effectively removed from the contact, and conduction of the contact is ensured. According to the above-described configuration, it is possible to provide the relay control device 6 capable of effectively suppressing occurrence of relay contact failure due to the adhesion of siloxane-derived insulator to the contact.

Figure 3:
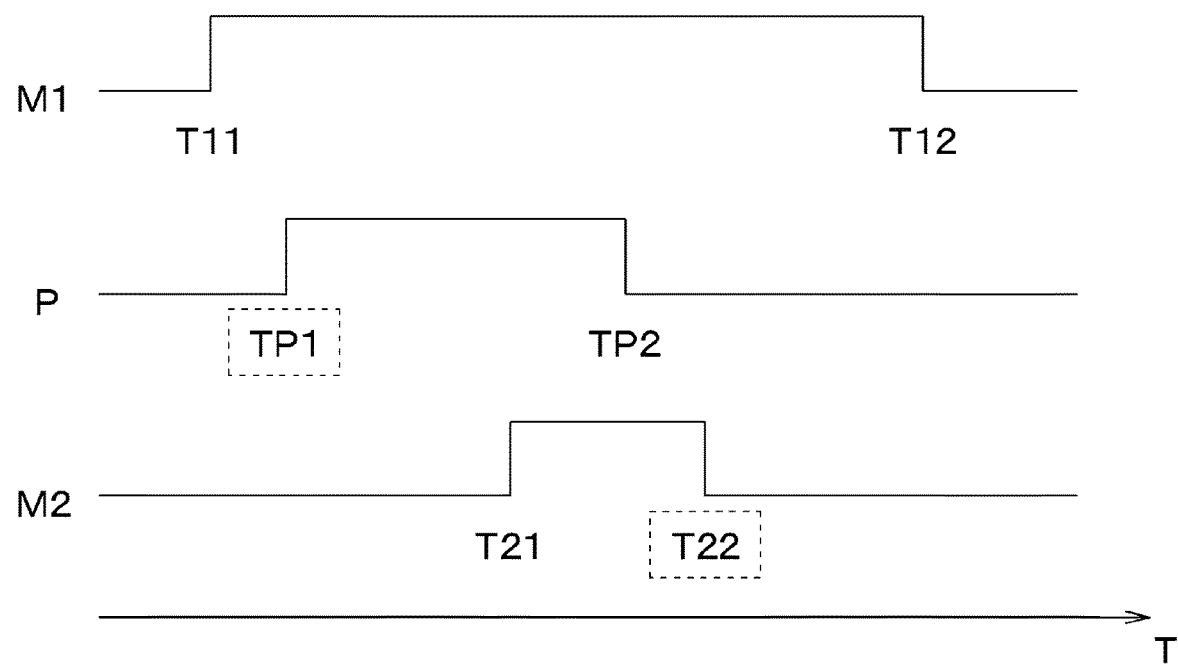
FIG. 3 is a time chart showing an operation control of a relay circuit according to a comparative example.

FIG. 3 shows a comparative example in which turn-on of relays are in the order of T11, TP1, T21 from the earliest to the latest, and turn-off of relays are in the order of TP2, T22, T12 from the earliest to the latest. In FIG. 3, the horizontal axis T indicates time. In FIG. 3, "M1", "M2", and "P" indicate the first main relay 511, the second main relay 512, and the pre-charge relay 513, respectively.

In the comparative example shown in FIG. 3, electric connection between the electric load 2 and the battery 4 starts at time point TP1 when the pre-charge relay 513 is turned on, and electric connection between the electric load 2 and the battery 4 is ended at time point T22 when the second main relay 512 is turned off. Therefore, the insulator derived from siloxane may be generated in the vicinity of contacts of the second main relay 512 and the pre-charge relay 513. In this regard, in the pre-charge relay 513, even when an insulator is adhered to or deposited on the contact before the pre-charge relay is turned on, the insulator is broken by application of high voltage at the time the pre-charge relay is turned on. Thus, conduction of the contact of pre-charge relay can be secured. In the second main relay 512, even when an insulator is adhered to or deposited on the contact due to heat caused by the cut-off electric arc, high voltage is not applied to the contact at the time the second main relay is turned on. Thus, the insulator is not broken and removed from the contact of second main relay. Therefore, in the comparative example, the second main relay 512 may have a contact failure caused by the adhesion and deposition of insulator on the contact.

With consideration of such a problem of contact failure due to adhesion or deposition of insulator on the relay contact, for example, a solution of using a sealed relay is considered. However, the sealed relay is more expensive than the open relay because of an increase in cost. The increase of cost is caused by increase in the number of components and the number of processing steps for manufacturing the sealed structure. Therefore, when adopting the sealed structure relay, the cost of entire device in the battery pack 3 or the vehicle system 1 may increase. In addition, even in the sealed relay, the siloxane gas may enter the inside space of relay under the use environment. Therefore, even when the sealed structure relay is used, it is not always possible to completely solve the problem of above-described contact failure.

In the present embodiment, by applying the high voltage to one relay and cut-off the electric connection using the same relay (that is, the first main relay 511 in the above-described embodiment), the insulator adhered to or deposited on the contact surface of relay can be broken and removed by the application of high voltage when the contact of relay is turned on. Therefore, according to the present embodiment, by appropriately setting the turn-on and turn-off sequence, the problem of contact failure can be effectively solved without using a sealed structure relay.

Modification

The present disclosure is not necessarily limited to the above embodiment. It is possible to properly change the above-described embodiment. The following will describe a typical modification. In the following description of modification, differences from the above embodiment will be mainly described. In the following modification, the same reference symbols as the above-described embodiment are assigned to the same or equivalent parts. Therefore, in the following description of modification, the description in the above embodiment can be appropriately incorporated for the components having the same reference symbols as those in the above embodiments, unless there is a technical contradiction or a special additional description.

The present disclosure is not limited to the specific device configuration described in the above embodiment. For example, the positive/negative relationship between the first terminal 41 and the second terminal 42 may be opposite to one another from that described in the above embodiment. That is, the first terminal 41 may correspond to the negative electrode terminal, and the second terminal 42 may correspond to the positive electrode terminal.

In the above embodiment, all of the first main relay 511, the second main relay 512, and the pre-charge relay 513 are provided by open relays. However, the present disclosure is not limited to this configuration. At least one of the first main relay 511, the second main relay 512, or the pre-charge relay 513 may be provided by a sealed relay.

In the above embodiment, the inter-contact electric arc is generated every time the first main relay 511 is turned on or turned off. Therefore, in the first main relay 511, there is a concern that contact wear is promoted due to damage to the contact due to the inter-contact electric arc. Therefore, the order of T 11 and TP 1 may be properly changed at an arbitrary frequency. That is, the relay control device 6 may switch the first operation sequence and the second operation sequence at an arbitrary frequency. In the first operation sequence, the pre-charge relay 513, the first main relay 511, and the second main relay 512 are turned on in described order, and then the pre-charge relay 513, the first main relay 511, and the second main relay 512 are turned off in described order, similar to the above-described embodiment. In the second operation sequence, the first main relay 511, the pre-charge relay 513, and the second main relay 512 may be turned on in described order, and then the pre-charge relay 513, the first main relay 511, and the second main relay 512 may be turned off in described order, in which the order of time points T11 and TP 1 are switched from the above-described embodiment. According to this configuration, the times of electric arc generation when the first main relay 511 is turned on can be reduced, and thus contact wear of the first main relay can be effectively suppressed. In the second operation sequence, an electric arc is generated in the pre-charge relay 513. But the generation of electric arc in the pre-charge relay is not occurred at turn-off time which causes the adhesion and deposition of the insulator derived from the siloxane, but at turn-on time which has the effect of breaking and removing the generated and deposited insulator. Thus, even when the second operation sequence is used, it is possible to effectively avoid occurrence of relay contact failure caused by adhesion of siloxane-derived insulator to the contact of pre-charge relay 513. The switching frequency may be properly set as an arbitrary frequency, that is, random frequency, or may be set as a predetermined cycle using a counter, a timer, or the like. The switching frequency may be properly set based on a monitoring result of electric connection state (that is, for example, a comparison between a detection value of current or voltage with a predetermined threshold value).

The constituent element(s) of each of the above embodiments and the above modifications is/are not necessarily essential unless it is specifically stated that the constituent element(s) is/are essential in the above embodiments, or unless the constituent element(s) is/are obviously essential in principle. When numerical values such as the number, amount, and range of elements are mentioned, the present disclosure is not limited to the specific numerical values unless otherwise specified as essential or obviously limited to the specific numerical values in principle. Similarly, when the shape, direction, positional relationship, and the like of an element or the like are mentioned, the present disclosure is not limited to the shape, direction, positional relationship, and the like unless the shape, direction, positional relationship, and the like are described as essential or limited to a specific shape, a specific direction, a specific positional relationship, and the like in principle.

The modification is not limited to the above example. For example, multiple modifications may be combined with one another under a condition that there is no technical contradiction.

The above-described operation in the relay control device 6 may be implemented as a computer program stored in a computer-readable non-transitory tangible storage medium provided in the relay control device 6, which has a configuration provided by a microcomputer. That is, the present disclosure may be provided as a program or a non-transitory tangible storage medium storing the program. In the relay control device 6, a portion may be provided by the microcomputer or ASIC. In the relay control device 6 according to the present disclosure, the functional blocks and method thereof may be implemented by a combination of (a) a processor and a memory programmed to execute one or more functions embodied by a computer program and (b) a processor including one or more dedicated hardware logic circuits.

According to the present disclosure, it is possible to provide the sealed battery pack in which the occurrence of relay contact failure is effectively eliminated even in a case where an open relay is used. That is, the present specification also discloses a battery pack having the following configuration.

A battery pack comprising:
   a battery having a first terminal and a second terminal as a pair of terminals;
   a relay circuit disposed between an electric load and the battery;
   a case accommodating the relay circuit in sealed manner; and a relay control device controlling an operation of the relay circuit, wherein the relay circuit includes: a first main relay disposed in a first conduction path which is a conduction path connected to the first terminal; a second main relay disposed in a second conduction path which is a conduction path connected to the second terminal; and a pre-charge relay connected to the second conduction path in parallel with the second main relay, and the relay control device turns on the pre-charge relay, the first main relay, and the second main relay in order, and then turns off the pre-charge relay, the first relay, and the second relay in order.

What is claimed is:

1. A relay control device controls an operation of a relay circuit, the relay circuit including a first main relay, a second main relay, and a pre-charge relay, the relay control device comprising a microcomputer that controls on and off states of the first main relay, the second main relay, and the pre-charge relay, wherein the relay circuit is disposed between a battery and an electric load, the battery has a first terminal and a second terminal as a pair of terminals, the relay circuit is sealed in a case of a battery pack that includes the battery, the first main relay is disposed in a first conduction path which is connected to the first terminal of the battery, the second main relay is disposed in a second conduction path which is connected to the second terminal of the battery, the pre-charge relay is connected to the second conduction path in parallel with the second main relay, the microcomputer switches, at an arbitrary frequency, a first operation sequence and a second operation sequence, in the first operation sequence, the microcomputer turns on the pre-charge relay, the first main relay, and the second main relay in order, and then turns off the pre-charge relay, the first main relay, and the second main relay in order, and in the second operation sequence, the microcomputer turns on the first main relay, the pre-charge relay, and the second main relay in order, and then turns off the pre-charge relay, the first main relay, and the second main relay in order.

2. The relay control device according to claim 1, wherein at least one of the first main relay, the second main relay, or the pre-charge relay is an open relay.

3. A battery pack comprising:

a battery having a first terminal and a second terminal as a pair of terminals;

a relay circuit disposed between an electric load and the battery;

a case accommodating the relay circuit in sealed manner; and a relay control device controlling an operation of the relay circuit, wherein the relay circuit includes: a first main relay disposed in a first conduction path which is connected to the first terminal of the battery; a second main relay disposed in a second conduction path which is connected to the second terminal of the battery; and a pre-charge relay connected to the second conduction path in parallel with the second main relay, the relay control device switches, at an arbitrary frequency, a first operation sequence and a second operation sequence, in the first operation sequence, the relay control device turns on the pre-charge relay, the first main relay, and the second main relay in order, and then turns off the pre-charge relay, the first main relay, and the second main relay in order, and in the second operation sequence, the relay control device turns on the first main relay, the pre-charge relay, and the second main relay in order, and then turns off the pre-charge relay, the first main relay, and the second main relay in order.

4. The battery pack according to claim 3, wherein at least one of the first main relay, the second main relay, or the pre-charge relay of the relay circuit is an open relay.

* * * * *